US008091166B2

(12) United States Patent
Gil Coto et al.

(10) Patent No.: US 8,091,166 B2
(45) Date of Patent: Jan. 10, 2012

(54) EXTENDABLE COVER FOR WALKWAYS FOR ACCESSING AIRCRAFT

(75) Inventors: Sandra Gil Coto, Langreo (ES);
Fernando Escapa Galguera, Las Vegas (ES); Miguel Olay Rubio, Noreña (ES); Luis Joaquin Fernandez Alvarez, Gijon (ES); Javier Marques Arias, Oviedo (ES); Joaquin Blanco Fernandez, Gijon (ES)

(73) Assignee: Thyssenkrupp Elevator Innovation Center, S.A., Asturias (ES)

( * ) Notice: Subject to any disclaimer, the term of this patent is extended or adjusted under 35 U.S.C. 154(b) by 561 days.

(21) Appl. No.: 12/187,784

(22) Filed: Aug. 7, 2008

(65) Prior Publication Data
US 2009/0205147 A1    Aug. 20, 2009

(30) Foreign Application Priority Data

Feb. 18, 2008 (ES) ................................... 200800434

(51) Int. Cl.
*E01D 1/00* (2006.01)
(52) U.S. Cl. ....................................................... 14/71.5
(58) Field of Classification Search .................... 14/71.5
See application file for complete search history.

(56) References Cited

U.S. PATENT DOCUMENTS

| | | | | |
|---|---|---|---|---|
| 3,263,254 A * | 8/1966 | Wollard et al. | ................ | 14/71.5 |
| 3,538,528 A * | 11/1970 | Jacobson et al. | ................ | 14/71.5 |
| 3,561,030 A * | 2/1971 | Seipos | .................. | 14/71.5 |
| 3,793,662 A * | 2/1974 | Gacs et al. | .................... | 14/71.5 |
| 3,843,987 A * | 10/1974 | Lodjic | ................ | 14/71.5 |
| 5,084,936 A * | 2/1992 | Thomas, Jr. | .................. | 14/71.5 |
| 6,212,724 B1 * | 4/2001 | Zhou | .................. | 14/71.5 |
| 6,789,286 B1 * | 9/2004 | Hutton et al. | .................. | 14/71.5 |
| 6,802,096 B2 * | 10/2004 | Savage | ................. | 14/71.5 |
| 7,269,871 B2 * | 9/2007 | Koch et al. | .................... | 14/71.5 |
| 7,360,268 B2 * | 4/2008 | Hubner et al. | ................. | 14/71.5 |
| 7,596,826 B2 * | 10/2009 | Anderberg | .................... | 14/71.5 |

* cited by examiner

*Primary Examiner* — Gary S Hartmann
(74) *Attorney, Agent, or Firm* — Merchant & Gould P.C.

(57) ABSTRACT

The invention relates to an extendable cover for walkways for accessing aircraft, especially for the connection between the rotunda and the tunnel of a walkway, which is formed by at least two telescopically coupled casings (9 and 10) which are linked to one another at the lower part according to a transverse pin defined by two aligned linkages (15) connecting the side walls (11 and 13) of each side of said casings at the lower part.

11 Claims, 4 Drawing Sheets

EXTENDABLE COVER FOR WALKWAYS FOR ACCESSING AIRCRAFT

FIELD OF THE INVENTION

The present invention relates to an extendable cover for walkways for accessing aircraft intended to be used as a connection means between components of the walkways, for example to connect the rotunda and tunnel of boarding walkways.

The cover of the invention is especially designed to be used as a covering and closing means between the tunnel and rotunda, in order to offer a good isolation to the users against external agents such as rain, wind etc., whatever the position adopted by the walkway during its service.

BACKGROUND OF THE INVENTION

Boarding walkways for passengers used in airports are generally formed by a rotunda with a fixed height which is connected to the boarding gate of the airport, by a cabin which is connected to the door for accessing the aircraft, and by a tunnel running between the rotunda and cabin and forming the movement path for the passengers to access the aircraft from the airport.

The height of the cabin depends on the type of plane to which the walkway is connected. Since the height of the cabin can vary and the height of the rotunda is fixed, the inclination of the tunnel connecting the cabin and the rotunda will vary, depending on the plane to which the walkway is connected, the tunnel being able to run with an upward or downward inclination from the rotunda. For this reason, there must be a connection between the rotunda with a fixed height and the tunnel with a variable inclination which allows varying the inclination of said tunnel and which furthermore offers a good closure in order to isolate the users from the exterior.

In traditional boarding walkways this connection is carried out by means of a fixed device always adopting the same configuration for any service position of the walkway, whereby the volume occupied by this device remains constant, making the transport and handling operations of this device difficult and more expensive and above all creating a certain resistance to the movements of the tunnel.

Another existing system for this connection consists of elastic or flexible bellows which are adapted by being extended and compressed to each service position of the walkway. The problem of the elastic closures is their short life, which forces frequent replacements and repairs.

SUMMARY OF THE INVENTION

The object of the present invention is to eliminate the problems set forth by means of a cover allowing the tunnel complete freedom of movements, effectively closing the attachment between the rotunda and the tunnel, offering a perfect protection to the users, and having a simple constitution and operation with a long duration and with reduced cost.

Another object of the invention is to have a connection cover between the rotunda and the tunnel formed such that it allows reducing the volume of the connection device, making its transport and handling easier, and all this as a result of a constitution allowing the cover to take on different configurations according to the service needs.

By means of the cover of the invention a reliable continuity can be achieved for any inclination of the walkway, both with positive and negative slopes within the operation limits.

As has been previously indicated, the cover of the invention is especially indicated to be used as a connection and closing means between the rotunda and the tunnel, a tunnel which can have a telescopic configuration and which can take on different positive or negative inclinations.

According to the invention, the cover is formed by at least two casings which can be telescopically coupled defining the section of passage between the rotunda and the tunnel. These casings are linked to one another at the lower part according to a transverse pin which is parallel and close to the passable surface of the tunnel.

Each of the casings is formed by two side walls and an upper wall or ceiling, the casings being connected to one another through two aligned linkages connecting the side walls of each side of said casings at the lower part, defining the linkage pin between the previously mentioned casings.

The inner casing can pivot on the mentioned linkage pin with respect to the outer casing, between a drawn in or maximum coupling position in which said inner casing is inside the outer casing and forms therewith an angle which is practically nil, and a drawn out position in which the inner casing forms a maximum angle with the outer casing, limited by retaining elements.

The innermost casing is connected to the tunnel through the outer edge of its wall and ceiling. The outer frame in turn is coupled inside the rotunda with the ability to move linearly with respect to it between maximum coupling positions, which will coincide with the also maximum coupling position between the two casings and in which the tunnel virtually reaches up to the rotunda, and a maximum drawn out position which is limited by retaining stops arranged between the rotunda and the outermost casing.

The relative movement between casings is carried out similarly to a telescopic system, with an angular movement between casings, in which all casings are drawn in one position and are completed extended in the opposite position.

For negative slopes of the walkway the space to be covered by the cover of the invention is greater, therefore the casings are opened in the shape of a fan until reaching the maximum drawn out position in which they close the separation between the tunnel and the rotunda. For positive slopes the space to be covered decreases, therefore the casings are coupled to one another, being adapted to the service needs, reducing the overall volume occupied by the cover.

As has been indicated the inner casing is integral with the tunnel, controlling the movement of said inner casing. The movement of the inner casing with respect to the rotunda is demarcated in the maximum drawn out position by stops located in said rotunda. Furthermore, so that the entire system follows a smooth transition, gas cylinders are arranged connecting the outer casing with the tunnel and having a dual function: on one hand cushioning the movement between the two casings and as a safety device to prevent the outer casing from rotating in the direction opposite to the desired direction.

According to another aspect of the invention, in order to achieve a correct movement between the inner and outer casings, an intermediate coating based on a material with a low coefficient of friction is arranged therebetween. This coating can consist of polyamide strips or bands fixed to the side walls of the inner or outer casing for example.

Rubber sealants are placed between the casings for the purpose of achieving a perfect seal between the casings and thus preventing water or another external agent from being introduced.

The upper walls or ceiling of the casings can be finished in the overlapped edges, in folds directed in opposite directions, each towards the ceiling of the other casing, the fold of the innermost casing being inside the outermost fold. The fold of the outer ceiling can also bear a longitudinal profile made of flexible material, which is supported by its free edge on the inner ceiling of the casing and is used as a sealing means between the two casings.

The retaining stops of the outer casing can consist of opposing ribs projecting outwardly from the ceiling of the outer casing and inwardly from the ceiling or frame of the rotunda. These ribs are arranged such that they collide against one another in the maximum drawn out position of the outer casing.

The walls of the casings, especially the side walls, can have folds which are used as reinforcement means and which furthermore open out into water collecting channels arranged immediately below the lower edge of the walls.

At least one intermediate casing having an identical constitution can be telescopically coupled between the outer and inner casings. The intermediate casing or casings will be coupled to one another and with the outer and inner casing in a manner similar to that described and will also be connected to said inner and outer casing through the two previously described lower linkages.

The linkages connecting the casings are preferably located near the lower edge of the side walls and furthermore moved towards the longitudinal edge of said walls farthest from the tunnel.

The casings preferably have a vertical rectangular contour, formed by two side walls and an upper wall or ceiling as has already been indicated, lacking a lower wall, which will form the passable surface of the tunnel.

BRIEF DESCRIPTION OF THE DRAWINGS

The attached drawings show a non-limiting embodiment, with the description of which the features and advantages of the cover of the invention can be better understood.

In the drawings.

DETAILED DESCRIPTION OF THE PREFERRED EMBODIMENT(S)

Figure 1:
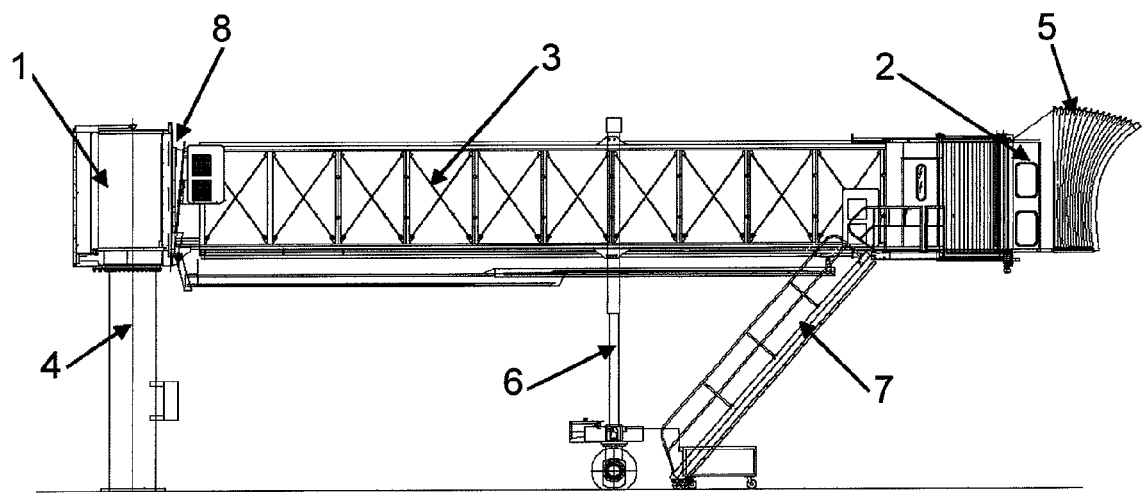
FIG. 1 is a side elevation view of a boarding walkway with a traditional constitution including the cover of the invention.

FIG. 1 shows a traditional boarding walkway, which is formed by a rotunda 1 with a fixed height, a cabin 2 with an adjustable height and a passable tunnel 3 connecting the rotunda 1 and the cabin 2.

The rotunda 1 is assembled on a column 4 and will be connected to the boarding gate of the airport.

The cabin 2 is coupled, for example by means of a hood 5, to the door for accessing the plane.

The tunnel 3 is supported by two elevation columns 6 with an adjustable height, which will allow adapting the cabin 2 with its bellows 5 to doors located at different heights, belonging to planes with different dimensions or features. The cabin 2 can further have a staircase 7 for accessing from the platform of the airport.

Since the rotunda 1 has a fixed height, the tunnel 3 will run with a positive or negative slope from the rotunda 1 in planes with more or less height.

When the tunnel 3 runs with a negative slope, between the ceiling and walls of the tunnel 3 and the ceiling and walls of the rotunda 1 a space is created which is closed by means of the cover 8 of the invention, which is shown in greater detail in FIGS. 2 to 5.

Figure 2:
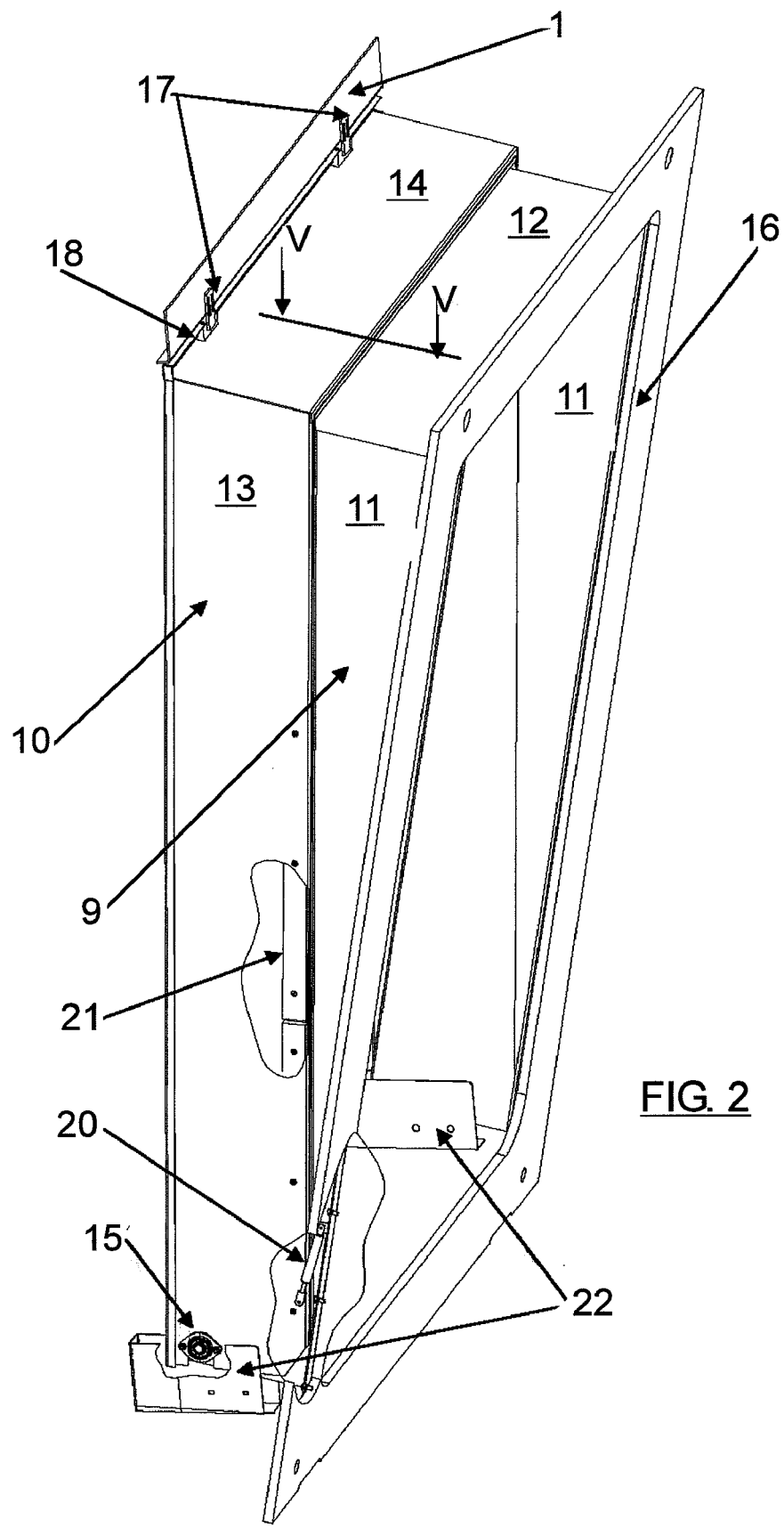
FIG. 2 is a perspective view the cover of the invention in an extended position for a negative slope of the tunnel.
Figure 3:
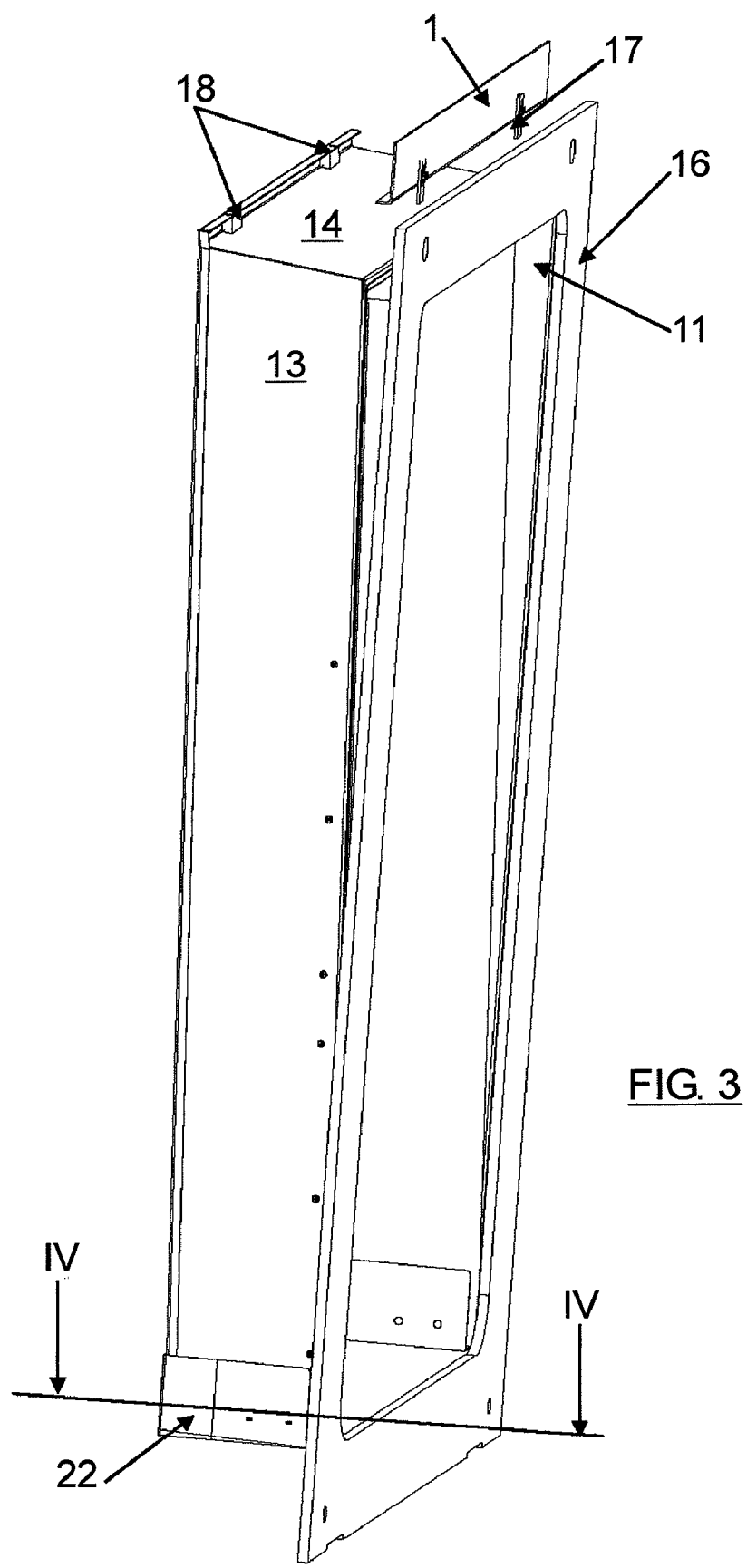
FIG. 3 is a perspective view similar to FIG. 2 with the cover drawn in for a positive slope of the tunnel.

In the example depicted in the drawings, the cover of the invention, as can be better seen in FIGS. 2 and 3, is formed by two casings telescopically coupled to one another, an inner casing 9 and another outer casing 10, although it must be understood that the cover can be formed by more than two casings, including intermediate casings which will be coupled to one another with the inner 9 and outer 10 casings in a manner similar to how casings 9 and 10 are connected, as will be set forth below.

The inner casing 9 is formed by two side walls, with reference number 11, and by an upper wall or ceiling with reference number 12. The outer casing 10 is likewise formed by two side walls, with reference number 13, and by an upper wall or ceiling, with reference number 14. The two casings have a rectangular contour and define the section of passage between the rotunda 1 and the tunnel 3 of the walkway.

The side walls 11 and 13 of each side of the two casings 9 and 10 are connected by means of respective aligned linkages 15, defining a transverse linkage pin between the two casings, a pin which is located close and parallel to the passable surface of the tunnel.

The inner casing 11 is connected to the tunnel 3, for example by means of a frame 16 finishing said tunnel. The outer casing 13 in turn is coupled inside the rotunda with respect to which it can be linearly moved between an inner position, in which it is virtually completely housed within the rotunda, and a drawn out position, in which said casing 13 is virtually completely outside the rotunda, this outermost position being limited by retaining stops defined by projections 17 projecting at the lower part from the ceiling of the rotunda 1, and stops 18 projecting at the upper part from the ceiling 14 of the outer cover 10, both projections being opposite in order to act as stops when the outer casing 13 reaches the maximum drawn out position.

With the described arrangement, since the inner casing 11 is connected to the tunnel 3, depending on the inclination of the latter, said inner casing can pivot with respect to the outer casing 13 and about the pin defined by the linkages 15, between a drawn in position, with maximum coupling in the outer casing 13, in which it will form therewith an angle which is practically nil, as shown in FIG. 3, and a drawn out position in which the inner casing forms a maximum angle with the outer casing, shown in FIG. 2 and which is limited by retaining elements formed by gas cylinders 20 connecting the outer casing 13 with the frame 16 of the tunnel 3.

FIG. 2 shows the cover in the position which it will occupy when the tunnel runs with a negative slope, closing the separation between the tunnel and the rotunda, whereas FIG. 3 shows the position which the cover will occupy when the tunnel runs with a positive slope.

The gas cylinders 20 constantly drive the outer casing 10 towards the casing 16 of the tunnel 3 and have a maximum length which will limit the maximum drawn out position of the inner casing 11 with respect to the outer casing 13.

A coating based on a material with a low coefficient of friction, for example formed by polyamide strips or bands 21, can be arranged in order to facilitate the sliding between the inner and outer casings, in the side walls thereof, on the opposite surface, FIG. 2.

For the purpose of providing greater strength to the casings, the side walls thereof can be arranged in folds opening out at the lower part into respective water collecting channels 22.

As can be observed in FIG. 2, the linkages 15 are located near the lower edge of the side walls 11 and 13 of the two casings and moved towards the longitudinal edge of these walls which is farthest from the tunnel 3 or frame 16 thereof. The casing 11 will thus pivot projecting progressively downwardly in order to offer an effective closure between the rotunda and the tunnel when it runs with a negative slope.

Figure 4:
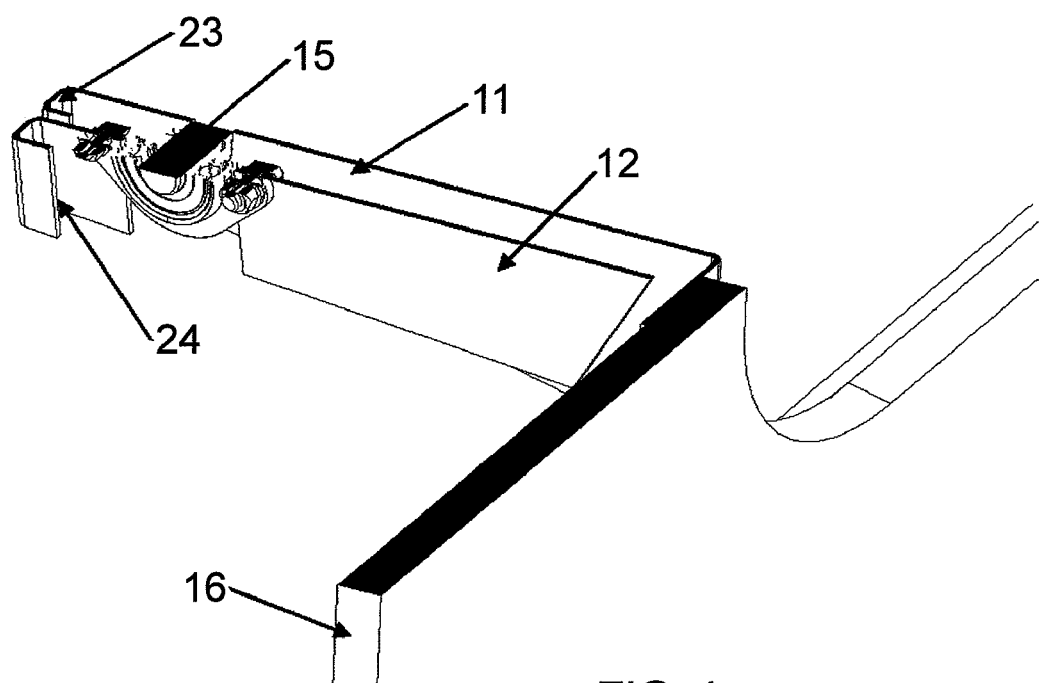
FIG. 4 is a partial vertical section of the cover of the invention taken according to section line IV-IV of FIG. 3.

FIG. 4 shows vertical end folds 23 and 24 of the walls 11 and 13 of the inner and outer casings, which will open out into the lower channels 22, FIG. 2. FIG. 4 further shows a possible constitution of the linkages 15, connecting the side walls of the two casings.

Figure 5:
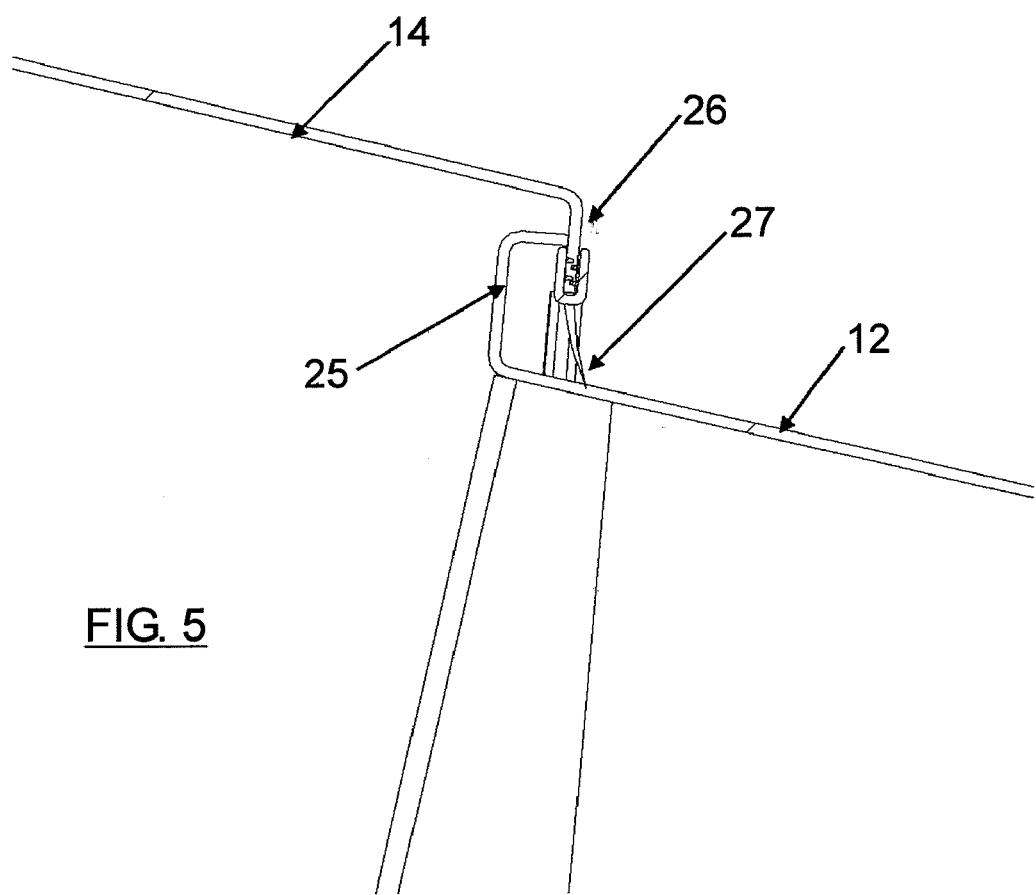
FIG. 5 is a partial vertical section of the cover of the invention taken according to section line V-V of FIG. 2.

As can be observed in FIG. 5, the upper walls or ceilings 12 and 14 of the two casings can be finished in the overlapped edges, in folds 25 and 26 directed in opposite directions, each fold being directed towards the ceiling of the other casing and the fold 25 of the ceiling 12 of the innermost casing being located behind and inside the fold 26 of the ceiling 14 of the outermost casing. The fold 26 of the outer ceiling 14 will also bear a longitudinal profile 27 made of flexible material, which will be supported against the outer surface of the ceiling 12 of the innermost casing, in order to be used as a closing or tightness means.

As previously set forth, between the inner 9 and outer 10 casings one or more intermediate casings can be arranged which would be coupled to one another and with said inner and outer casings in the same way as described and also connected to them through the lower linkages 15.

Whatever the number of casings forming the cover, in the drawn in position, shown in FIG. 3, they will occupy much less space than that shown in FIG. 2, in its extended position. The position of FIG. 3 will be suitable for their transport and handling, as well as for the service of the walkway with positive slopes. For the service of the walkway with negative slopes the configuration of the cover would be that of FIG. 2.

The inner casing 11 is integral with the tunnel 3, as has already been set forth, such that the inclination of the tunnel will determine the position of said inner casing. The casings will be simultaneously moved in the drawn in position of FIG. 3, until the outer casing 10 projects from the rotunda until reaching the maximum drawn out position, in which the projections 17 and 18, FIG. 2, abut, fixing the maximum drawn out position of the casing 13. If from this time the negative inclination of the tunnel continues, the inner casing 11 will continue its pivoting movement, since it is integral with the tunnel, spreading out until its maximum drawn out position, shown in FIG. 2, if necessary.

Starting from this maximum drawn out position shown in FIG. 2, if the tunnel starts to rise, it causes an reverse movement in which the inner casing 11 is introduced into the outer casing 13, pushed by the tunnel, whereas the outer casing 13 remains fixed by the action of the gas cylinders 20 until the casings overlap. At this time the tunnel pushes the two coupled casings, overcoming the force exerted by the cylinders 20 until the maximum raised position of service, in which the casing 13 is inside the rotunda.

The invention claimed is:

1. An extendable cover for a walkway having a rotunda and a tunnel, the cover of the walkway connecting the rotunda and the tunnel, the walkway comprising at least two telescopically coupled casings including an inner casing and an outer casing, defining a section for passage between the rotunda and the tunnel, the casings being linked to one another at a lower part by a transverse pin parallel and close to a passable surface, the casings are formed by two side walls and an upper wall or ceiling and are connected to one another through two aligned linkages connecting the side walls of each side of said casings at a lower part to define the linkage pin through which the inner casing can pivot with respect to the outer casing between maximum coupling drawn in position, in which said inner casing is inside the outer casing and forms therewith a minimum angle, and a drawn out position, in which the inner casing forms a maximum angle with the outer casing greater than minimum angle, limited by retaining elements; the inner casing being connected to the tunnel through an outer edge of the walls and ceiling, the outer casing being coupled inside the rotunda to move linearly with respect to the rotunda between a maximum coupling position, in which the tunnel reaches up to said rotunda, and a maximum drawn out position limited by retaining stops arranged between said rotunda and the outer casing.

2. A cover according to claim 1, wherein a coating based on a material with a low coefficient of friction is arranged between the side walls of the casings and is fixed to one of said walls.

3. A cover according to claim 2, wherein the coating comprises polyamide strips or bands.

4. A cover according to claim 1, wherein the upper walls or ceilings of the casings include overlapped edges, in folds directed in opposite directions, each of the folds being directed towards the ceiling of the other casing, the fold of the inner casing being inside and behind the fold of the outer casing.

5. A cover according to claim 4, wherein the fold of the ceiling of the outer casing has a longitudinal profile made of flexible material supported by a free edge on the ceiling of the adjacent inner casing.

6. A cover according to claim 1, wherein the retaining elements comprise gas cylinders assembled between the side walls of the outer casing and the tunnel, the cylinders of which constantly drive said outer casing towards the tunnel and have a maximum length limiting the drawn out position of the inner casing.

7. A cover according to claim 1, wherein the retaining stops comprise opposing ribs projecting outwardly from the ceiling of the outer casing and inwardly from the ceiling or frame of the rotunda, the ribs of which collide against one another in the maximum drawn out position of said outer casing.

8. A cover according to claim 1, wherein the side walls of the casings have folds opening out into two water collecting channels arranged below a lower edge of said walls.

9. A cover according to claim 1, further comprising at least one intermediate casing between the outer and inner casings, wherein the at least one intermediate casing has an identical configuration and is telescopically coupled, the at least one intermediate casing being connected to said inner and outer casing through the two linkages at a lower part.

10. A cover according to claim 1, wherein the linkages are located near a lower edge of the side walls and moved towards a longitudinal edge of said walls farthest from the tunnel.

11. A cover according to claim 1, wherein the casings have a vertical rectangular contour.

\* \* \* \* \*